United States Patent
Gunness

(10) Patent No.: US 9,500,555 B2
(45) Date of Patent: Nov. 22, 2016

(54) METHOD AND SYSTEM FOR LEAK DETECTION IN ROOFING AND WATERPROOFING MEMBRANES

(76) Inventor: Clark Robert Gunness, Nashville, TN (US)

(*) Notice: Subject to any disclaimer, the term of this patent is extended or adjusted under 35 U.S.C. 154(b) by 1124 days.

(21) Appl. No.: 13/442,586

(22) Filed: Apr. 9, 2012

(65) Prior Publication Data

US 2012/0197565 A1 Aug. 2, 2012

Related U.S. Application Data

(63) Continuation-in-part of application No. 13/009,356, filed on Jan. 19, 2011, now Pat. No. 8,566,051.

(60) Provisional application No. 61/336,244, filed on Jan. 19, 2010.

(51) Int. Cl.
| | | |
|---|---|---|
| E04D 13/00 | (2006.01) | |
| G06F 17/00 | (2006.01) | |
| G01M 3/16 | (2006.01) | |
| E04D 12/00 | (2006.01) | |

(52) U.S. Cl.
CPC .............. *G01M 3/16* (2013.01); *E04D 13/006* (2013.01); *G01M 3/165* (2013.01); *E04D 12/002* (2013.01); *E04D 13/00* (2013.01)

(58) Field of Classification Search
CPC ....... G01M 3/16; G01M 3/165; G06F 17/00; E04D 12/002; E04D 13/00; E04D 13/006
USPC .......................................................... 702/64
See application file for complete search history.

(56) References Cited

U.S. PATENT DOCUMENTS

| | | | | |
|---|---|---|---|---|
| 3,900,102 | A * | 8/1975 | Hurst | 206/411 |
| 4,386,981 | A * | 6/1983 | Clapperton | 156/71 |
| 4,543,158 | A * | 9/1985 | Bondoc et al. | 162/145 |
| 4,947,470 | A * | 8/1990 | Darilek | 324/557 |
| 5,081,422 | A * | 1/1992 | Shih | 324/693 |
| 5,335,536 | A * | 8/1994 | Runnevik | 73/40.7 |
| 5,648,724 | A * | 7/1997 | Yankielun et al. | 324/533 |
| 6,167,666 | B1 * | 1/2001 | Kelly | 52/302.1 |
| 6,222,373 | B1 * | 4/2001 | Morrison | 324/534 |
| 6,252,388 | B1 * | 6/2001 | Jaeger et al. | 324/96 |
| 6,331,778 | B1 * | 12/2001 | Daily et al. | 324/557 |
| 6,428,684 | B1 * | 8/2002 | Warburton | 205/775 |
| 6,535,134 | B2 * | 3/2003 | Lang et al. | 340/603 |
| 7,212,015 | B2 * | 5/2007 | Kitaoka | 324/662 |
| 7,308,830 | B2 * | 12/2007 | Harasyn et al. | 73/718 |
| 7,652,479 | B2 * | 1/2010 | Cooper et al. | 324/444 |
| 8,096,180 | B2 * | 1/2012 | Yamanaka et al. | 73/504.12 |
| 8,319,508 | B2 * | 11/2012 | Vokey | 324/718 |

(Continued)

*Primary Examiner* — Sujoy Kundu
*Assistant Examiner* — Lynda Dinh
(74) *Attorney, Agent, or Firm* — Michael Persson; Catherine Napjus; Lawson Persson

(57) ABSTRACT

A system for detecting and locating a leak through a membrane that includes a detector array, a signal generator, a flexible sheet over-membrane, a conductive felt, and a computer. The detector array includes a boundary wire loop and sensors. The signal generator applies voltage to the boundary wire loop. The conductive felt is applied on top of the detector array. The flexible sheet over-membrane is applied on top of the conductive felt. At least the downward, detector array-facing side of the over-membrane is non-conductive. The computer is in electrical communication with the boundary wire loop, the sensors, and the signal generator.

16 Claims, 4 Drawing Sheets

(56) References Cited

U.S. PATENT DOCUMENTS

| | | | |
|---|---|---|---|
| 2002/0121061 A1* | 9/2002 | Rippey | 52/408 |
| 2003/0167826 A1* | 9/2003 | Holt | 73/40 |
| 2003/0219589 A1* | 11/2003 | Taniguchi et al. | 428/323 |
| 2004/0118185 A1* | 6/2004 | Duerr | 73/40.7 |
| 2005/0257491 A1* | 11/2005 | State | 52/742.1 |
| 2006/0228963 A1* | 10/2006 | Souther et al. | 442/86 |
| 2006/0249679 A1* | 11/2006 | Johnson et al. | 250/332 |
| 2006/0260237 A1* | 11/2006 | Griffin et al. | 52/409 |
| 2006/0289772 A1* | 12/2006 | Johnson et al. | 250/370.08 |
| 2007/0015061 A1* | 1/2007 | Klaassen | 429/322 |
| 2007/0024458 A1* | 2/2007 | McGinty et al. | 340/605 |
| 2007/0227083 A1* | 10/2007 | Skobba | 52/202 |
| 2007/0227084 A1* | 10/2007 | Skobba | 52/202 |
| 2008/0099678 A1* | 5/2008 | Johnson et al. | 250/332 |
| 2009/0044595 A1* | 2/2009 | Vokey | 73/1.17 |
| 2009/0050806 A1* | 2/2009 | Schmidt et al. | 250/332 |
| 2009/0064618 A1* | 3/2009 | Ben-Daat et al. | 52/408 |
| 2009/0077982 A1* | 3/2009 | Brower | 62/50.7 |
| 2009/0159177 A1* | 6/2009 | Muncaster et al. | 156/71 |
| 2009/0302219 A1* | 12/2009 | Johnson et al. | 250/332 |
| 2010/0127848 A1* | 5/2010 | Mustapha | G08B 21/20 340/505 |
| 2010/0141283 A1* | 6/2010 | Vokey | 3/2 |
| 2010/0189977 A1* | 7/2010 | Griffin et al. | 428/215 |
| 2010/0224307 A1* | 9/2010 | Khan et al. | 156/71 |
| 2010/0227103 A1* | 9/2010 | Hohmann, Jr. | 428/41.8 |
| 2010/0229662 A1* | 9/2010 | Brower | 73/865.8 |
| 2010/0230058 A1* | 9/2010 | Mahoney | 160/331 |
| 2011/0041891 A1* | 2/2011 | Rummens et al. | 136/244 |
| 2011/0047695 A1* | 3/2011 | Niedens | 4/679 |
| 2011/0178747 A1* | 7/2011 | Gunness | G01M 3/16 702/65 |

* cited by examiner

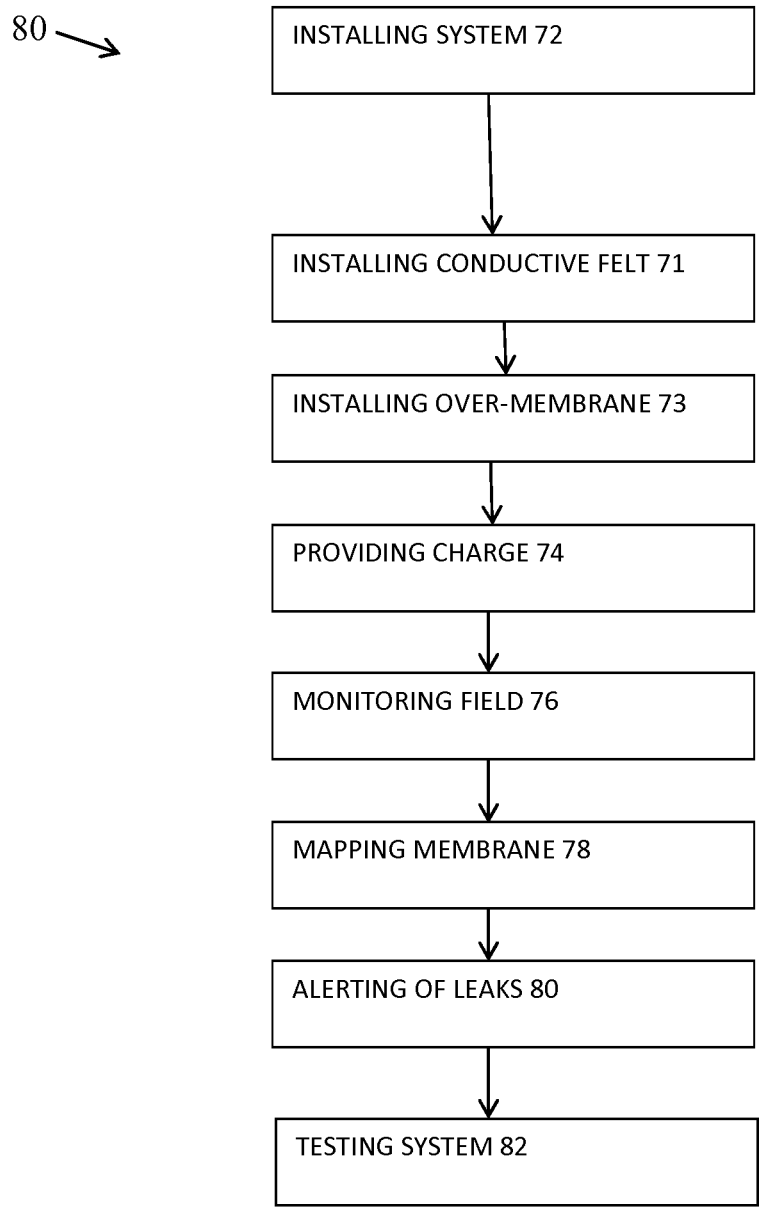

METHOD AND SYSTEM FOR LEAK DETECTION IN ROOFING AND WATERPROOFING MEMBRANES

CLAIM OF PRIORITY

This application claims the benefit of priority of U.S. Pat. No. 8,566,051, filed on Jan. 19, 2011, which claimed the benefit of priority of U.S. Provisional Patent No. 61/336,244, filed on Jan. 19, 2010.

FIELD OF THE INVENTION

The present invention relates to the detection and location of water leakage in structures, and in particular to computer controlled leakage detection and location systems.

BACKGROUND

Roof and waterproofing membranes and linings have long been used to protect buildings, to contain water in ponds and decorative water features, to prevent leaching of contaminants from landfills, and for other purposes. While these membranes have utility, leakage through the membranes is an ongoing problem. The efforts to contain and locate leakage have resulted in the rise of specialized consultants, air and vacuum testable membranes, and, in recent history, electrical testing methods that not only determine if a leak is present in a membrane system, but where the leak is located.

Such an electrical testing method and system that determines both that a leak is present in a membrane system, and where the leak is located is disclosed in the Inventor's U.S. Pat. No. 8,566,051, which is hereby incorporated by reference. This Application discloses a system for detecting and locating a leak through a membrane that includes a detector array and computer. The detector array includes a boundary wire loop, sensors, and leads. The boundary wire loop surrounds the area to be tested and generates electrical tension on the surface of the membrane. The sensors are laid out in a sensor array and are placed on top of a membrane and within the boundary wire loop. The sensors are encased in a plastic covered cable or individual wires which have open ends for their terminations forming a cable so that the sensors made by the open terminations form a chain. Each sensor communicates individually with the computer and the signals from the sensors are used by the computer to perform vector mapping that detects and locates leaks through the membrane.

Although successful for its purpose in many situations, it may be improved upon in situations where anything conductive is running across the roof or waterproofing, or is contained in the overburden layer, and that element is connected to ground. Examples of such situations include where the leak detection system is covered with soil overburden that has conduits on it, concrete overburden that is tied to the grounded structure of the building, or a combination thereof. More specific examples of such elements may include conduits or lightning cables. In such situations, the leak detection system may detect grounding from above and falsely identify it as leaks through the waterproofing membrane. If the element connected to ground is disconnected from the ground or electrically isolated, then the leak detection system will continue to work as envisioned. It is desirable, however, for the leak detection system to include a feature to address such situations, rather than dealing with the grounded elements on a case by case basis. Therefore there is a need for an improvement over the Inventor's prior invention that addresses such situations.

SUMMARY OF THE INVENTION

The present invention is a system and method for leak detection and location.

In its most basic form, the system of the present invention includes a detector array, a signal generator, a flexible sheet over-membrane, and a computer. The detector array includes a boundary wire loop, sensors, and leads. The boundary wire loop surrounds the area to be tested, generates electrical tension on the surface of the membrane, and is connected to the computer by a lead. The sensors are laid out in a grid, or sensor array, and are placed on top of an impermeable roofing or waterproofing membrane, and within the boundary wire loop. The sensors, or open cable ends, form a chain and are either encased in a protective conductive plastic coating or are run as individual wires that have open ends for their terminations forming a cable so that the open terminations, in a string, form a sensor strip. Each sensor in a sensor strip has its own dedicated wire so that it, and only it, may communicate with the computer. The sensor strips may be connected to the computer by leads.

The system also includes a signal generator. The signal generator is in electrical communication with the boundary wire loop and controlled by the computer. When the system is activated, the signal generator provides voltage to the boundary wire loop, thus creating an electrical field. The sensor array is preferably within this field. The signal generator preferably generates an approximately 38 volt electrical pulse over the surface of the waterproofing membrane. This voltage is measured by the sensors, and in the presence of a ground, reaches 0 volts. In some embodiments, the voltage may be varied by the computer to provide maximum definition of leak detection and location. In some embodiments, the signal generator is separate from the computer, but is still controlled by the computer.

The flexible sheet over-membrane overlays the detector array. It acts as an electrical current barrier or insulator. The over-membrane is placed directly on top of the detector array and shields the detector array from grounding and electrical interferences by elements in the overburden, such as metal conduits, lightning cables, grounded concrete, and metal water piping. In other words, the over-membrane contains the 38 volt pulse over the detector array next to the waterproofing membrane, so that it cannot stray upward into the overburden. In embodiments of the present invention that include a conductive felt, as described below, the conductive felt may be between the detector array and the over-membrane. The over-membrane is non-conductive on at least the side that faces the detector array when the over-membrane is in place. It may be non-conductive on both sides or be non-conductive on one side and conductive on the other. The over-membrane is made out of any flexible plastic or other non-conductive material, such as PVC, polyethylene, or polypropylene, and may or may not be welded at the seams. The over-membrane may serve as a root barrier, which is required by hot and cold fluid applied waterproofing membranes, and certain other built-up and single ply waterproofing membranes.

In other embodiments, the over-membrane is produced by applying a sprayed-on or rolled-on liquid, electrically non-conductive material onto a conductive felt, as described below. The liquid will dry or cure into an electrically impermeable membrane supported by the conductive felt, which is a mesh or non-woven fabric. The material of the conductive felt will act as a separation medium that protects the detector array from the sprayed-on or rolled-on liquid material.

In embodiments where the side facing away from the detector array is conductive, if the over-membrane is breached, the conductive layer of the over-membrane will become electrically active, carrying a pulse from the detector array some small distance over the surface of the conductive layer. Because the conductive layer of the over-membrane will impart energy to the grounded layer above, with which it is in contact, the conductive layer will become part of the boundary cable assembly that carries the pulse and forms the electrical tension grid that is measured by the system. An electrical dip in the voltage will be measured by the system. This anomaly in the voltage will be measured by the system, but it will be apparent that the anomaly comes from the over-membrane, rather than from a leak in the waterproofing membrane. Therefore, knowing exactly where the sensors are placed in the grid, and knowing what sort of voltages may be expected at any distance from an actual, grounded leak in the waterproofing membrane to a sensor allows the system to rule out grounded anomalies from above, particularly in breaches in the over-membrane.

The computer preferably includes a processor, memory, and a software product stored in the memory and executable by the processor. The computer may be a computer located on the same premises as the detector array, or it may be a hand-held portable computer or a remote computer. The computer may relay information to a central processing computer for mapping and evaluation of the data collected from the sensors. This relaying is preferably performed via the Internet. The software product is the software product described in U.S. Pat. No. 8,566,051.

In preferred embodiments, the system of the present invention also includes a conductive felt. It is preferred that the conductive felt is applied directly on top of the detector array, which is applied directly on top of the waterproofing membrane. In other embodiments, the conductive felt is applied directly on top of the waterproofing membrane and below the detector array. In either embodiment, the current is carried across the entire surface of the waterproofing membrane. As such, whether the detector array is wet or dry, the electrical pulse is distributed evenly over the sensor field, and any sensor will detect something each time it is polled by the computer. In some embodiments of the current invention, the system includes a conductive felt, but not an over-membrane. Some embodiments include both.

The conductive felt is preferably made of conductive felt or mesh, but may also be made of intrinsically conductive randomly oriented glass fiber or conductive fiberglass strands woven into a mat. The conductive felt is essentially a surrogate for water. There are many times when there might not be any water on the waterproofing membrane, but the field formed by the boundary wire loop still has to be present and measurable. Thus, it can happen that, if a portion of the field formed by the boundary wire loop is dry and of a certain shape, perhaps extending to a portion of the boundary wire so that that portion of the cable is unable to contribute to the field, this can distort the reading that is seen by the computer as it polls the sensors. The conductive felt solves this problem. As the conductive felt has a conductivity very similar to water, it can be used in wet or dry situations and maintain a similarly conductive field as if there were only water present.

As discussed above with reference to the over-membrane, in some embodiments, a liquid, electrically non-conductive coating is sprayed or rolled onto the side of the conductive felt facing away from the detector array so as to act as the over-membrane. The conductive felt protects the detector array from the liquid coating before it dries or cures into the over-membrane. The result is an over-membrane with the electrical barrier capacity to protect the detector array from stray ground signals from above, in the overburden, and also with the ability to carry the electrical pulse at the detector array, enabling even distribution of the electrical pulse in wet or dry conditions.

Other features of the system are as disclosed in the Inventor's U.S. Pat. No. 8,566,051.

In its most basic form, the method of the present invention includes the steps of installing a detector array on top of a roofing or waterproofing membrane, installing an over-membrane over the detector array, providing a charge to a boundary wire loop that is part of the detector array, monitoring the resultant electrical field, mapping the membrane, and alerting as to the presence of a leak or breach when necessary. In some embodiments, the method may also include the step of installing a conductive felt over the waterproofing membrane. In some embodiments, the method may also include the step of testing the system.

Therefore it is an aspect of the present invention to identify and locate leakage in roofing and waterproofing membranes utilizing the principles of electrical field vector mapping, but applying the principle to a permanently installed, computer controlled, always-on system.

It is a further aspect of the present invention to provide a system that does not indicate false leaks from conductive overburdens.

It is a further aspect of the present invention to provide a leak detection system that includes a root barrier.

It is a further aspect of the present invention to provide a leak detection system that includes a conductive felt layer to carry current over an entire surface to be tested.

It is a further aspect of the present invention to provide a leak detection system that includes an over-membrane with the electrical barrier capacity to protect the detector array from stray ground signals from above, in the overburden, and also with the ability to carry the electrical pulse at the detector array, enabling even distribution of the electrical pulse in wet or dry conditions.

These aspects of the present invention are not meant to be exclusive and other features, aspects, and advantages of the present invention will be readily apparent to those of ordinary skill in the art when read in conjunction with the following description, claims, and accompanying drawings.

BRIEF DESCRIPTION OF THE DRAWINGS

FIG. 6 is a block diagram showing the steps of the method of the present invention.

DETAILED DESCRIPTION

Figure 1:
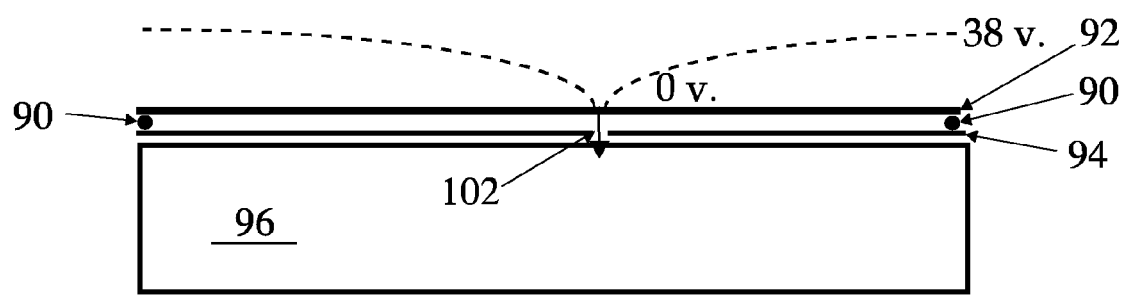
FIG. 1 is a diagram showing a leak in a waterproofing membrane with nothing conductive above the detector array.
Figure 5:
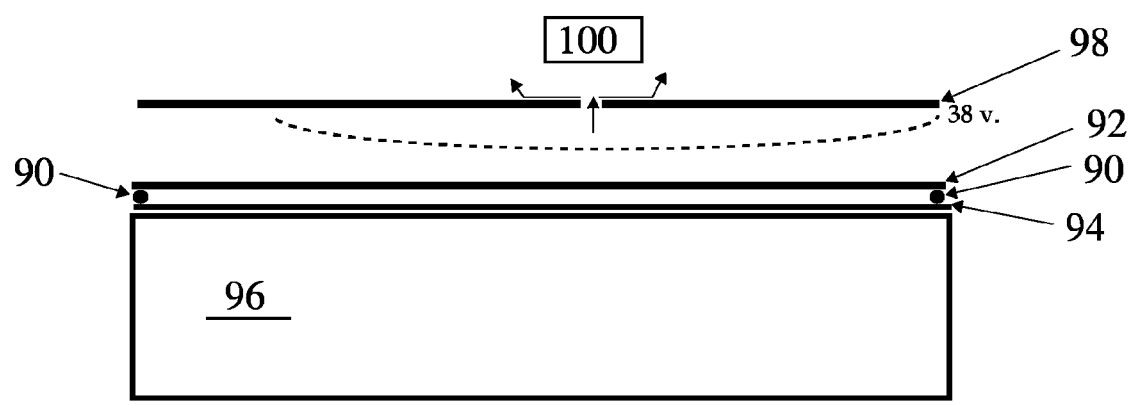
FIG. 5 is a diagram showing a breach in the over-membrane of the present invention that has non-conductive surfaces on both sides.

Referring first to FIG. 1, the situation where there is nothing conductive above the detector array and waterproofing membrane 94 has leak 102 is shown. All elements of the detector array are shown in FIGS. 5 and 6 of U.S. Pat. No. 8,566,051. For simplicity, in FIG. 1, and the following figures, the detector array is represented by a single element, boundary cable 90. Other common reference numbers within the current application's figures refer to common elements between the figures. Waterproofing membrane 94 is placed on top of building 96. Current direction is indicated by dashed lines and arrows. Where appropriate, current indications are included in the diagram. The 38 volt electrical pulse generated by the signal generator reaches 0 volts at leak 102. Conductive felt 92 is present on top of boundary cables 90, which are on top of waterproofing membrane 94. In each of these FIGS., it is understood that conductive felt 92 may also be positioned between waterproofing membrane 94 and boundary cables 90, i.e. under the detector array.

Figure 2:
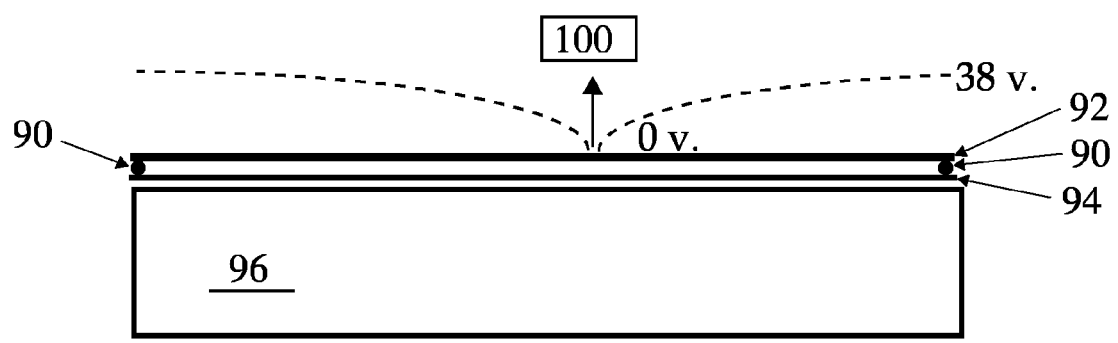
FIG. 2 is a diagram showing a conductive grounded overburden element causing a false leak indication.

Now referring to FIG. 2, the situation where conductive grounded overburden element 100 is causing a false leak indication where there is no leak in waterproofing membrane 94 is shown. Conductive grounded overburden element 100 draws current away creating a situation that the system reads as identical to that shown in FIG. 1, but in the absence of leak 102.

Figure 3:
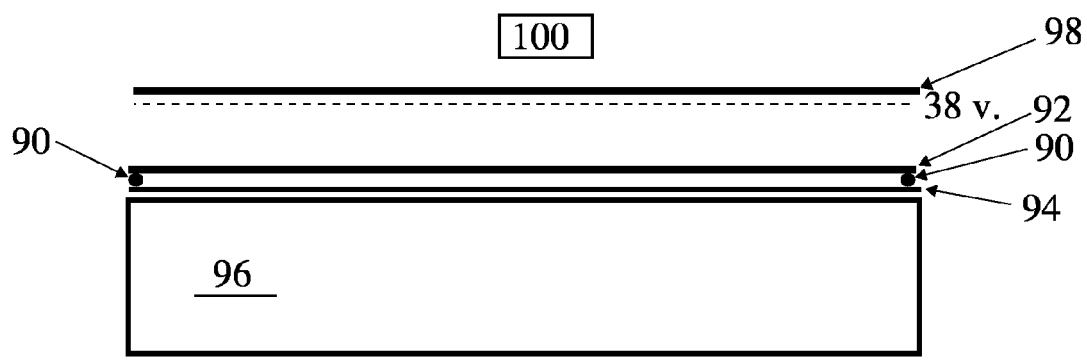
FIG. 3 is a diagram showing the over-membrane of the present invention protecting the system from indicating a false leak in the presence of a conductive grounded overburden element.

Now referring to FIG. 3, the situation of FIG. 2 is presented, except with the presence of over-membrane 98. Over-membrane 98 is placed over conductive felt 92, thereby containing the 38 volt pulse. Current is therefore not drawn to conductive grounded overburden element 100, and no false leak indication is provided. In each FIG. that shows both conductive felt 92 and over-membrane 98, such as FIG. 3, it is understood that these elements may be combined by including a conductive felt that has been treated by spraying or rolling on a liquid, electrically non-conductive coating onto the side of the conductive felt that faces away from the detector array, and allowing the liquid to dry.

Figure 4:
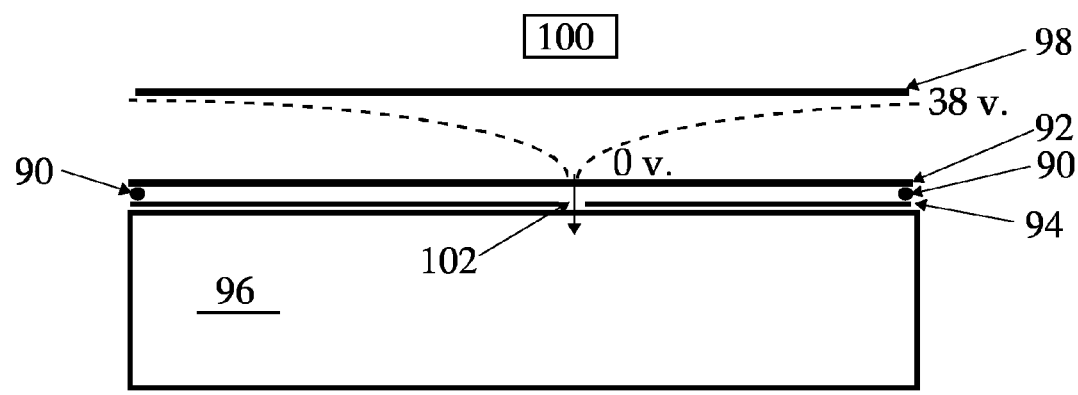
FIG. 4 is a diagram showing a leak in a waterproofing membrane with the over-membrane of the present invention and a conductive grounded overburden element.

Now referring to FIG. 4, the situation where there is conductive grounded overburden element 100 above over-membrane 98, and waterproofing membrane 94 has leak 102 is shown. The system reacts to leak 102 as it did in FIG. 1, as though conductive grounded overburden element 100 were not present.

Now referring to FIG. 5, the situation where waterproofing membrane 94 does not have a leak, but over-membrane 98 has puncture 104 is shown. In the embodiment shown, over-membrane 98 is non-conductive on both sides. Current is not drawing to conductive grounded overburden element 100, as in FIG. 2. No false leak in waterproofing membrane 98 is indicated, therefore.

FIG. 6 is a block diagram showing the steps of method 70 of the present invention. Method 70 of the present invention includes the steps of installing the system 72, installing the conductive felt 71, installing the flexible sheet over-membrane 73, providing a charge 74, monitoring the field 76, mapping the membrane 78, and alerting of leaks or breaches 80. In some embodiments, method 70 also comprises the step of testing the system 82.

The common steps with those described in U.S. Pat. No. 8,566,051 are as described therein. The additional steps of installing the conductive felt 71 and installing the flexible sheet over-membrane 73 are as described above.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A system for detecting and locating leak detection in roofing and waterproofing membranes comprising:
    a detector array comprising a boundary wire loop and sensors, wherein said boundary wire loop surrounds an area on top of the roofing or waterproofing membrane to be tested for leaks and wherein said sensors are positioned within said area to be tested;
    a signal generator in electrical communication with said boundary wire loop, wherein said signal generator applies voltage to said boundary wire loop;
    a flexible sheet over-membrane applied on top of said detector array; and
    a computer in electrical communication with said boundary wire loop, said sensors, and said signal generator, said first computer comprising:
        a processor;
        a non-transitory memory; and
        a software product stored in said non-transitory memory and executable by said processor.

2. The system as claimed in claim 1, wherein said flexible sheet over-membrane is plastic.

3. The system as claimed in claim 1, wherein said flexible sheet over-membrane comprises a downward, detector array facing side and an upward facing side and both of said downward, detector array facing side and said upward facing side are non-conductive.

4. The system as claimed in claim 1, wherein said flexible sheet over-membrane comprises a downward, detector array facing side and an upward facing side, wherein said downward, detector array facing side is non-conductive, and wherein said upward facing side is conductive.

5. The system as claimed in claim 1, further comprising a conductive felt made of conductive material that carries current over the roofing or waterproofing membrane and is placed between said detector array and said flexible sheet over-membrane.

6. The system as claimed in claim 1, further comprising a conductive felt overlay made of conductive material that carries current over the roofing or waterproofing membrane and is placed between the roofing or waterproofing membrane and said detector array.

7. The system as claimed in claim 1;
    further comprising a conductive felt made of conductive material comprising two sides that carries current over the roofing or waterproofing membrane and is placed on top of said detector array;
    wherein said flexible sheet over-membrane is a liquid, electrically non-conductive coating that has been applied to said side of said conductive felt that does not face said detector array, and has cured.

8. A system for detecting and locating leak detection in roofing and waterproofing membranes comprising:
    a detector array comprising a boundary wire loop and sensors, wherein said boundary wire loop surrounds an area on top of the roofing or waterproofing membrane to be tested for leaks and wherein said sensors are positioned within said area to be tested;
    a signal generator in electrical communication with said boundary wire loop, wherein said signal generator applies voltage to said boundary wire loop;

a conductive felt made of conductive material that carries current over the roofing or waterproofing membrane, wherein said conductive felt is placed on top of said detector array or between the roofing or waterproofing membrane and said detector array; and a computer in electrical communication with said boundary wire loop, said sensors, and said signal generator, said first computer comprising:
   a processor;
   a non-transitory memory; and
   a software product stored in said non-transitory memory and executable by said processor.

9. The system as claimed in claim 8, further comprising a flexible sheet over-membrane applied on top of said detector array, wherein said flexible sheet over-membrane comprises a downward, detector array facing side and an upward facing side and at least said downward, detector array facing side is non-conductive.

10. The system as claimed in claim 8;
   wherein said conductive felt has a downward facing side and an upward facing side;
   wherein a liquid, electrically non-conductive coating has been applied to said upward facing side of said conductive felt, and said liquid has cured; and
   wherein said conductive felt is placed on top of said detector array such that said downward facing side faces said detector array.

11. A method for detecting and locating leaks in roofing and waterproofing membranes comprising the steps of:
   installing a leak detection system on top of the roofing or waterproofing membrane, said installing comprising the steps of:
      laying out a boundary wire loop surrounding an area to be tested on the roofing or waterproofing membrane;
      laying out an array of sensors with the boundary wire loop;
      installing a flexible sheet over-membrane over the boundary wire loop and the array of sensors; and
      connecting the sensors within the sensor array electrically to a computer;
   wherein the computer performs the following steps of said method:
   providing a charge to the leak detection system, said charge provision comprising the step of applying voltage to the boundary wire loop, wherein said voltage application creates an electrical field within the area defined by the boundary wire loop;
   monitoring the electrical field created by said charge provision, said monitoring comprising the steps of:
      polling each of the sensors within the sensor array for voltage measurements; and
      detecting field distortions, wherein the field distortions comprise differences in voltage between sensors within the sensor array that have no other sensors in a direct path between the sensors and changes in voltage in a single sensor within the sensor array;
   mapping the roofing or waterproofing membrane, said mapping comprising the steps of:
      transposing a representation of the electrical field onto a geographical map of the roofing or waterproofing membrane to be tested; and
      locating a leak; and
   alerting as to the presence of a leak.

12. The method as claimed in claim 11, further comprising a step of installing a conductive felt made of conductive material on top of the boundary wire loop and the array of sensors.

13. The method as claimed in claim 11, further comprising a step of installing a conductive felt made of conductive material between the roofing or waterproofing membrane and the boundary wire loop and the array of sensors.

14. The method as claimed in claim 11, wherein said step of installing a flexible sheet over-membrane comprises installing a conductive felt made of conductive material having two sides that has had a liquid, electrically non-conductive coating applied and cured on one of the sides of the conductive felt, and said installing comprises placing the conductive felt on top of the array of sensors such that the side with the non-conductive coating is facing away from the array of sensors.

15. The method as claimed in claim 11, further comprising a step of the computer testing the leak detection system, said step of testing said leak detection system comprising the step of activating an exposed electrode.

16. The method as claimed in claim 15, wherein said step of testing the leak detection system further comprises the steps of:
   determining the presence of failed sensors; and
   compensating for any failed sensors within the sensor array.

* * * * *